United States Patent
Gage

[15] 3,662,941
[45] May 16, 1972

[54] APPARATUS FOR REMOVING A WELD UPSET

[72] Inventor: Arthur Gage, Warren, Mich.

[73] Assignee: North American Rockwell Corporation, Pittsburgh, Pa.

[22] Filed: June 18, 1970

[21] Appl. No.: 47,289

[52] U.S. Cl. .............................. 228/2, 29/470.3, 29/475, 156/73, 228/13, 228/19
[51] Int. Cl. .............................................. B23k 27/00
[58] Field of Search ............... 29/470.3, 475; 228/2, 13, 19; 156/73

[56] References Cited

UNITED STATES PATENTS

| | | | |
|---|---|---|---|
| 2,893,292 | 7/1959 | Naperola | 90/24 |
| 3,148,647 | 9/1964 | Woolley et al. | 228/13 |
| 3,234,646 | 2/1966 | Hollander et al. | 29/470.3 |
| 3,438,561 | 4/1969 | Calton | 228/13 |

Primary Examiner—John F. Campbell
Assistant Examiner—R. J. Craig
Attorney—John R. Bronaugh, E. Dennis O'Connor and Floyd S. Levison

[57] ABSTRACT

A method and apparatus for automatically removing a weld upset formed between a pair of coaxial workpieces butt welded into an integral article by friction welding or the like. The method and apparatus include a shearing device positioned closely adjacent the abutting surfaces of the workpieces during welding and automatically drawn through the weld upset upon completion of welding to remove the upset.

12 Claims, 8 Drawing Figures

Patented May 16, 1972

INVENTOR
Arthur F. Gage

Patented May 16, 1972

3,662,941

4 Sheets-Sheet

INVENTOR.
Arthur F. Gage.

INVENTOR
Arthur F. Gage.

APPARATUS FOR REMOVING A WELD UPSET

BACKGROUND OF THE INVENTION

In friction welding apparatus such as, for example, that shown and described in U.S. Patent application, Serial No. 769,892 for "Friction Welding Apparatus Having Improved Hydrostatic Bearing Arrangement," filed Oct. 23, 1968, in the name of Alex F. Stamm and assigned to the assignee of this application, a plurality of coaxial workpieces are relatively rotated at high speed and simultaneously formed together axially such that the frictional engagement therebetween results in the generation of heat sufficient to raise the temperature of the abutting ends of the workpieces to a fusing temperature. The relative rotation between the workpieces then is stopped and axial pressure is maintained for a period sufficient to permit cooling of the abutting ends and the formation of a sound joint therebetween. The axial pressure acting on the abutting workpieces both before and after the relative rotation is stopped causes the radially outward displacement from the weld regions of a substantial amount of weld metal. This displaced metal commonly is referred to by terms such as "weld upset," "weld curl," and the like. In some respects, this weld upset is similar to the peripheral weld "flash" formed during flash butt welding and it will be appreciated as this description proceeds that the present invention also has application to the removal of the flash formed during flash butt welding.

To improve the appearance of the welded component and to remove possible stress risers, it is common practice to remove the weld upset by additional machining operations such as filing, grinding or the like. The removal of the weld upset heretofore has added substantially to the cost of manufacture of the welded article since it has been necessary to allow the article to cool, remove it from the welding apparatus, transport it to a work station equipped with suitable weld removing equipment, remove the upset and finally remove the welded article from the upset removal station. The removal of the weld upset thus has been expensive in terms of both labor cost and capital investment.

It therefore is an object of this invention to provide an improved method and apparatus for economically removing the weld flash formed during friction welding or the like. This object is accomplished without requiring additional processing steps or a substantial investment in additional equipment. Also, the method and apparatus of this invention provide for the removal of weld flash automatically as an incidental portion of the welding process.

SUMMARY OF THE INVENTION

Briefly stated, in carrying out the invention in one form, means are provided for removing the weld upset formed during the butt welding of a pair of workpieces into an integral member. The upset removing means comprise a cutter having a configuration conforming closely to the configuration of the workpieces adjacent the butt welded region and means for drawing the cutter through the weld upset to shear the weld upset from the integral member. More particularly, in friction welding apparatus in which the pair of workpieces are cylindrical in form and are relatively rotated and axially forced into abutting engagement with each other by a pair of respective supports to form the weld region, the cutter is an annular member supported from one of the supports such that it surrounds the welded article and automatically is drawn through the weld upset upon completion of friction welding. By a further aspect of the invention, the cutter is supported by one of the supports such that during welding it surrounds the workpiece held by the other support. The cutter is pulled through the upset by its support upon completion of welding. This drawing of the cutter through the upset is accomplished due to its support releasing its workpiece and being forced away from the other support while the other support continues to hold the integral, welded article. By a still further aspect of the invention, the cutter has a continuous cutting edge having angles for providing suitable relief and for peripherally progressively initiating and completing removal of the weld upset.

DETAILED DESCRIPTION OF THE INVENTION

Figure 1:
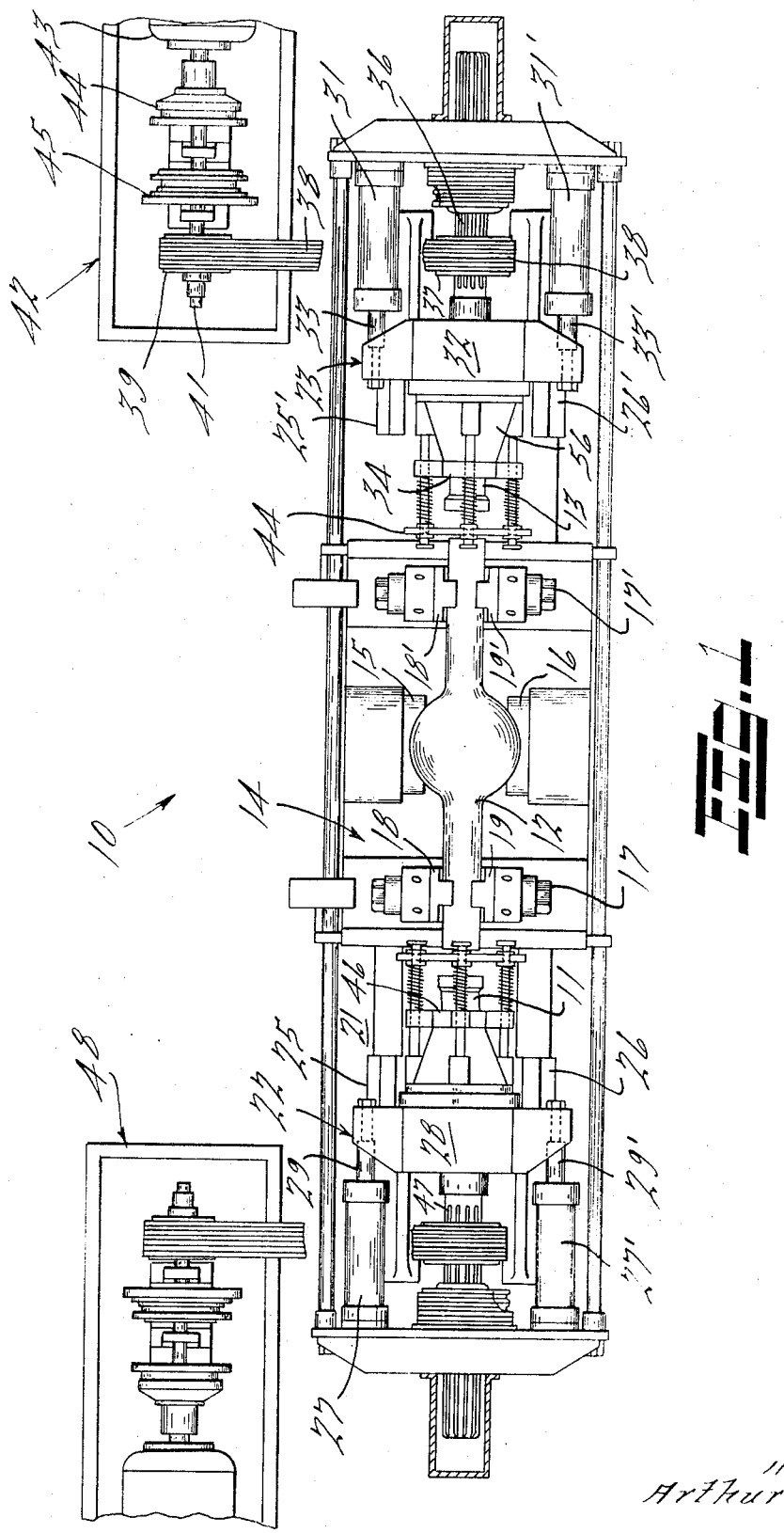
FIG. 1 is a plan view of a friction welding machine incorporating the shearing apparatus of the present invention.
Figure 2:
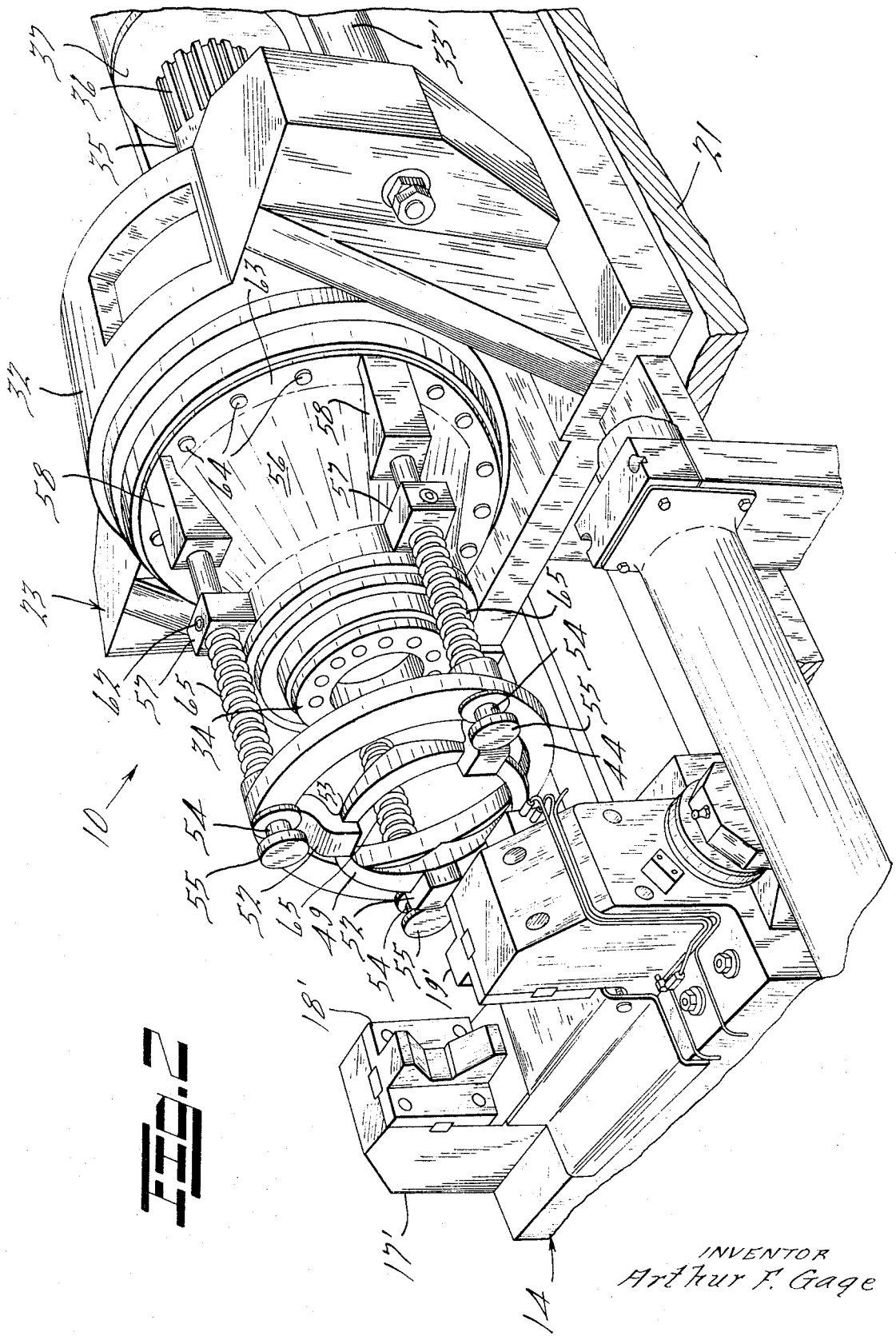
FIG. 2 is a perspective view of a portion of the friction welding machine of FIG. 1 showing in detail one of the weld upset removing cutters.

FIGS. 1 and 2 illustrate a friction welding machine 10 wherein three workpieces 11, 12 and 13 are adapted to be friction welded together. In this arrangement, the central workpiece 12, that may be an axle housing center section, is non-rotatably supported and the other two workpieces 11 and 13, that may be wheel bearing end spindles, are rotated while being axially forced into engagement with opposite ends of workpiece 12.

The central, or non-rotating, workpiece 12 is mounted in a cradle structure 14 wherein opposite sides thereof are engaged and held suitably by adjustable jaws 15 and 16. Each of the oppositely extending arms of workpiece 12 are clamped tightly between jaw fixtures 17 and 17' having transversely opposed jaws 18, 19 and 18', 19' respectively for gripping the workpiece 12. This arrangement supports and anchors workpiece 12 against rotation during welding. Cradle 14 and the fixtures 17 are suitably secured to the machine base 21.

Workpiece 11 is carried by a bearing unit carrier 22 and workpiece 13 is carried by a similar bearing unit carrier 23 at the opposite end of base 21. As will be described in greater detail below, the bearing unit carriers 22 and 23 support the workpieces 11 and 13 for rotation about an axis common with the axis of the workpiece 12, but prevent axial movement of the workpieces 11 and 13 relative to the carriers 22 and 23. As will hereafter appear, however, the carriers and the workpieces can be axially displaced along the common axis.

The carriers 22 and 23 are mounted on ways 25, 26, and 25', 26' respectively for axial sliding movement along the machine base 21. A pair of double acting power cylinders 27 and 27' are fixed on base 21 with their piston rods 29 and 29' projecting into rigid connection with the frame 28 of carrier 22. Introduction of fluid under pressure into both cylinders 29 and 29' in a known manner will advance or retract the carrier 22 toward or away from the stationary workpiece 12. In a similar manner, double acting power cylinders 31 and 31' connected to frame 32 of unit carrier 23 by rods 33 and 33' respectively, are capable of urging carrier 23 axially along ways 25' and 26'.

Journalled within frame 32 of bearing unit carrier 23 is a chucking device 34. Chucking devices such as device 34 are well known in the art and generally comprise a cylindrical housing having a central bore into which a workpiece to be chucked is located. The chucking device then may be adjusted externally thereof so that internal gripping means located within the central bore grasp the workpiece for unitary rotation with the chucking device. Chucking device 34, although freely rotatable within frame 32, is fixed against axial movement relative to bearing carrier unit frame 32, that is, chucking device 34 and frame 32 move axially in unison in response to motive force from power cylinders 31 and 31'.

The construction and mounting arrangement of chucking device 34 in frame 32 comprises no part of the present invention. Further details concerning this structure may be found in the aforesaid U.S. application Ser. No. 769,892.

Integrally secured to chucking device 34 for unitary rotation therewith is a shaft 35 having splined section 36 formed thereon. Shaft 35 extends through and beyond carrier 23 midway between cylinders 31 and 31+. Splined section 36 axially slidably, but non rotatably, extends through the hub of an axially stationary pulley 37 that is connected by belt 38 to a pulley 39 of an output shaft 41 of a power assembly 42. This power assembly consists essentially of an electric motor 43 connected to shaft 41 through a clutch unit 44 and having a braking unit 45 associated therewith. Since pulley 37 is confined against axial displacement and is secured to shaft 35 by a spline drive connection, power from unit 42 may be used to rotate shaft 35, chucking device 34 and workpiece 13 continuously as bearing unit 23, shaft 35, chucking device 34 and workpiece 13 are axially displaced by the forces from power cylinders 31 and 31'.

In a manner similar to that described above relative to carrier 23, a chucking device 46 is journalled within frame 28 of carrier 22 and may be rotated through power applied to a splined shaft 47 through a belt drive arrangement from a power unit 48 identical to unit 42. Accordingly, rotation of workpiece 11, that is held by chucking device 46, may occur simultaneously with axial movement of this workpiece.

Figure 3:
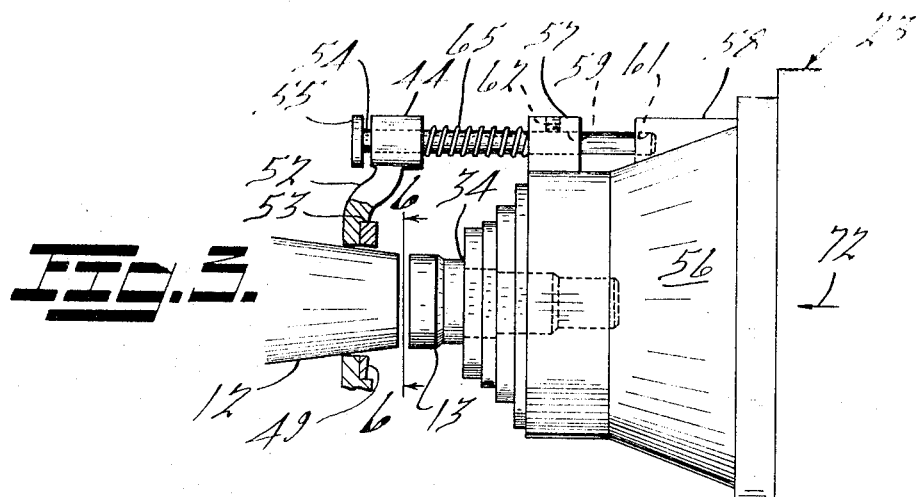
FIGS. 3, 4 and 5 are elevation views of a portion of the apparatus shown by FIG. 2, the cutter being shown in cross section and progressively showing the initiation and completion of friction welding and the removal of the weld upset formed during welding.

The friction welding process performed by the machine 10 will now be described with reference to FIG. 1. At the start of the welding cycle, the carriers 22 and 23 are positioned at opposite ends of the machine base 21. The center workpiece 12 is placed in its support structure, and the jaws 15, 16, 17 and 17' are tightened to non-rotatably hold the workpiece 12 on the common axis. The workpieces 11 and 13 are placed in the carriers 22 and 23 and are grasped by chucking devices 34 and 46 therein such that rotation of the shafts 35 and 47 will result in corresponding rotation of these workpieces. The rotating workpieces 11 and 13 then are moved axially along the common axis by the carriers 22 and 23 motivated by the cylinders 27, 27' and 31, 31' respectively, until their cylindrical end portions axially abut and rub against similarly shaped end portions of the center workpiece 12. FIG. 3 shows the workpieces immediately prior to initial contact.

Figure 4:
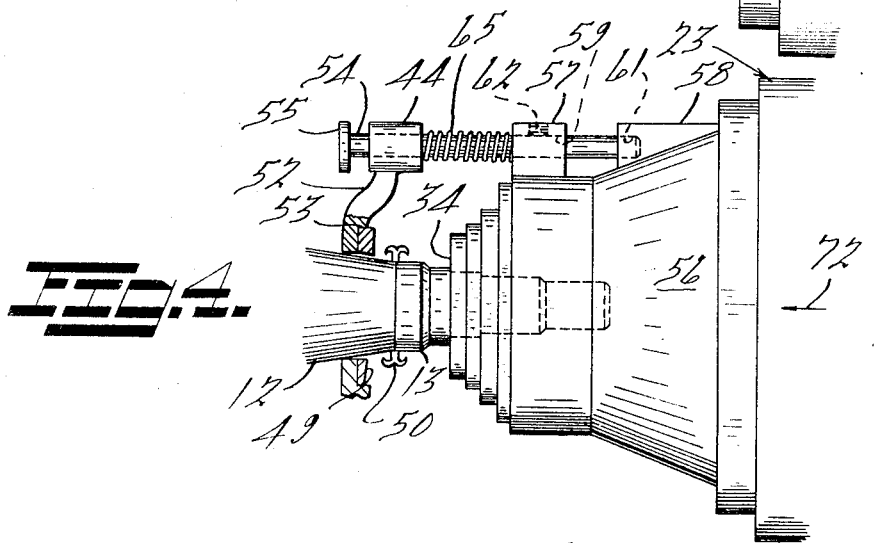
Figure 5:
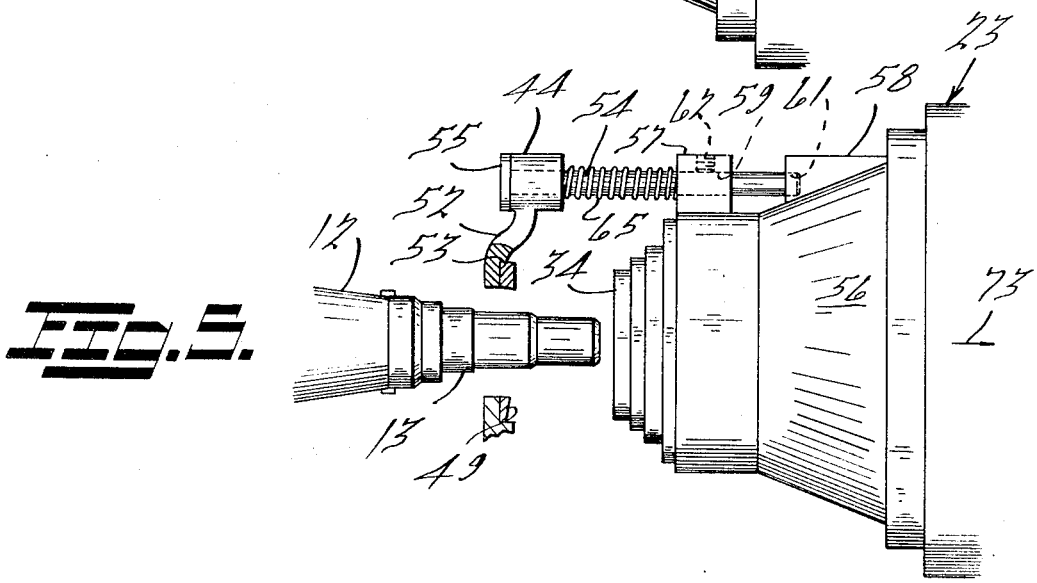

Frictional rubbing under pressure is continued until the abutting end portions are heated to a fusing temperature, at which time rotation of the workpieces is stopped through suitable operation of the clutches and brakes contained in power units 42 and 48. The axial pressure exerted on the workpieces 11 and 13 is maintained and even increased after the relative rotation is stopped to assure the formation of a sound weld joint and to permit the joint to cool. FIG. 4 illustrates the integral welded article thus formed. Thereafter, the workpieces 11 and 13 are released, and the carriers 22 and 23 are retracted axially by the double acting power cylinders with the integral welded article supported by its supporting central cradle structure 14 as indicated by FIG. 5. Finally, jaws 15, 16, 17 and 17' are released, and the integral welded article can be removed from the machine.

During the friction welding process, the axial pressure exerted on the abutting ends of the workpieces in combination with the plastic nature of the high temperature workpiece material at and immediately adjacent the ends results in the radial displacement out of the joint of a substantial amount of workpiece material. This displaced metal commonly is referred to as being a weld upset or curl, and such an upset is identified in FIGS. 4 and 8 of the drawing by the reference numeral 50, and for the reasons discussed above, this metal often is removed. The present invention provides means for automatically removing the peripheral weld upset as an incidental part of the normal welding cycle as described above. The present invention does not require any additional processing steps or the provision of additional machines. The shearing means of this invention comprises separate cutting devices carried by the carriers 22 and 23 such that the cutting devices are pulled through the weld upsets by the carriers as the carriers are axially retracted upon the completion of welding.

Only the weld upset shearing device associated with carrier 23 will be described in detail herein, it being understood that an identically constructed and functioning device is associated with the carrier 22. The weld upset shearing device on carrier 23 includes an annular cutter generally indicated in FIGS. 2, 6 and 7 by numeral 49 and is fixedly supported in spaced and axial alignment to the slidable carrier frame 32 by means of a circular cutter carrier member 51. This carrier member is generally annular in configuration and includes at least three equally spaced and inwardly directed fingers 52 the inner ends of which are stepped, as at 53 (FIG. 2), to provide a seat for the annular cutter 49 which is fixedly held therein by any suitable means such as by brazing or the like.

The cutter carrier member 51 is attached to the frame 32 by at least three pull bars 54 which extend through equally spaced apertures provided adjacent the outer periphery of member 51. These pull bars 54 extend in a plane spaced from and parallel with the axis of the annular cutter 49 and the ends thereof nearest the latter are provided with head portions 55 which are adapted to move the cutter to shear the weld upset in a manner to be more fully described hereinafter.

The ends of the pull bars 54 opposite the head portions 55 are assembled to a frusto-conical support member 56 by means of equally spaced pairs of integrally formed bosses 57 and 58 (FIGS. 2, 3, 4, and 5). As shown in FIGS. 3, 4 and 5, these pairs of bosses are disposed in spaced relation and include aligned openings 59 and 61 respectively which are adapted to receive and support the particular pull bar 54 individual thereto. Opening 61 in boss 58 provides a seat for the end of pull bar 54 and opening 59 in boss 57, is adapted to support a part of the shank portion of said pull bar in an area spaced from the end thereof. Boss 57 also includes a tapped hole communicating with opening 52 in which a set screw 62 assembles and serves as a means for fixedly positioning the pull bars. Support member 56 includes an outwardly directed flange 63 (FIG. 2) secured to carrier frame 32 by a plurality of fasteners 64 such as bolts or rivets.

Each pull bar 54 has a coil spring 65 assembled thereon (FIGS. 2, 3, 4 and 5) which extends for the length of the bar disposed intermediate boss 57 and the side of the cutter carrier member 51.

The annular cutter 49 illustrated in the various figures of drawing includes an inner relief angle 66 (FIG. 7) which permits unrestricted movement of said cutter over the workpiece when carried to and from the position for removing the weld upset material from the latter.

Figure 6:
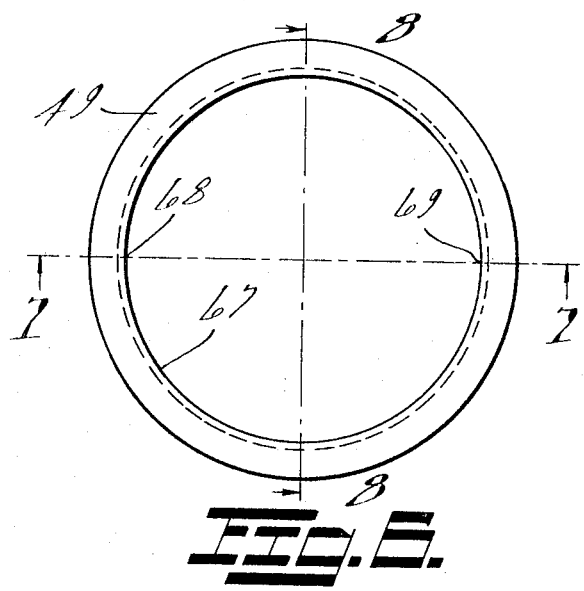
FIG. 6 is a view of the cutter only taken along viewing line 6—6 of FIG. 3.
Figure 7:
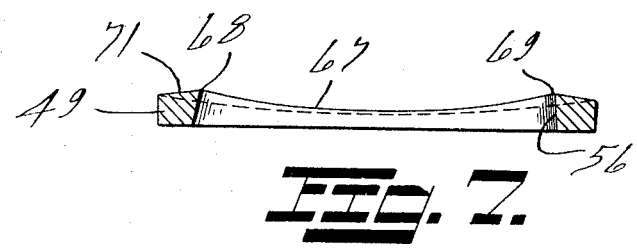
FIG. 7 is a view taken along viewing line 7—7 of FIG. 6.

The shearing edge of the cutter is identified in FIGS. 6 and 7 by numeral 67 which forms one side of the inner circumferential extent thereof. The shearing edge includes diametrically opposed points 68 and 69 (FIGS. 6 and 7) that are disposed in unaligned relation relative to the remaining portions of said shearing edge and define side rake angles for removing progressively the weld upset as the cutters are drawn therethrough. In otherwords, relative to the axis of the annular cutter the diametrically opposed points 68 and 69 of the shearing edge 67 are closer to the carrier frame 32 than those portions of said shearing edge disposed 90° circumferentially from said points 68 and 69. Thus, shearing edge 67 defines a pair of connected arcuated surfaces with the curves thereof bowing in an axial direction.

As shown in FIG. 7, the surface of the annular cutter intermediate the shearing edge 67 and its outer circumferential extent is angularly disposed to define a back rake angle 71 and provides clearance to facilitate removal of the weld upset as said cutter is drawn therethrough.

The operation of the weld upset shearing device during the steps of welding and the removal of the weld upset progressively are shown in FIGS. 3, 4 and 5 of the drawing.

Workpiece 13 is firmly held by the rotating device 34 and, as carrier 23 moves in the direction of the indicating arrow 72 in FIG. 3, the fingers 52 of the cutter carrier member 51 are caused to come into contact with the outer surface of the stationary workpiece 12. The cutter carrier 51 is unable to move beyond this point and it positions the annular cutter 49 in close proximity to the area in which the weld upset will form upon fusion of the two workpieces. In FIG. 4, the carrier 23 is shown as having moved further in the direction of the indicating arrow 72 which places the rotating workpiece 13 in frictional contact with the end of the stationary workpiece 12 and compresses coil spring 65 to permit the cutter carrier 51 to move down the length of pull bars 54.

It should be understood that carrier 22 simultaneously is moving workpiece 11 into contact with the opposite end of workpiece 12 and as a similar shearing device is carried by carrier 22, it is considered necessary to give a detailed description only of the shearing device carried by the housing element 23.

The heat generated by the frictional contact between the rotating workpiece 13 and the stationary workpiece 12 causes these workpieces to reach a fusing temperature. When this temperature is reached, rotation is terminated as described above to permit the fusion of the workpieces. The chucking hold on workpiece 13 then is released and, as shown in FIG. 5, the carrier 23 is caused to move in the direction of the indicating arrow 73. As the carrier 23 moves in this direction, the head portions 55 of the pull bars 54 once again come into contact with the cutter carrier member 51 due to the forces exerted by springs 65, and continued movement is effective to draw the carrier member 51 clear of both the fused workpieces.

Figure 8:
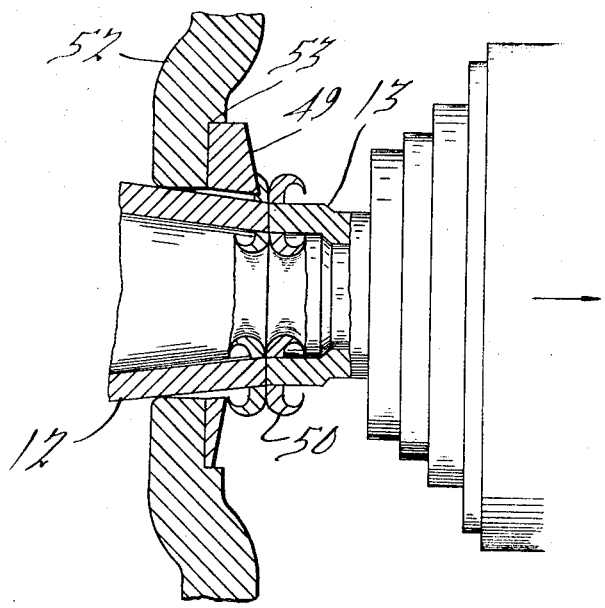
FIG. 8 is a view of the cutter taken along viewing line 8—8 of FIG. 6 showing the cutter in its operative environment just as the cutter begins to shear off the weld upset.

As the carrier member 51 is moved additionally in the direction of arrow 73, the annular cutter 49 is drawn through the weld upset (FIG. 8) and removes the upset, thereby eliminating subsequent machining operations. The particular configuration of the annular cutter with its bowed or curved shearing edge is effective as shown in FIG. 8 in starting the shearing action with that portion of the cutter nearest the carrier 23 prior to those portions most remote from said carrier coming into contact with the weld upset. The weld upset at this time is somewhat below the fusing temperature, yet is comparatively soft. Thus, the progressive contact between cutting edge 57 and the weld upset results in the latter being "peeled" off with a minimum amount of axially directed shearing force.

What is claimed as new and is desired to be secured by Letters Patent is:

1. Friction welding apparatus for friction welding a plurality of workpieces into an integral member, said friction welding apparatus comprising: a plurality of support means for selectively gripping a respective plurality of workpieces and relatively rotating adjacent ones of the workpieces about a common axis, means for relatively moving adjacent ones of the workpiece support means along said axis toward each other during friction welding and away from each other upon completion of friction welding, a first one of each adjacent pair of workpiece support means releasing its respective workpiece prior to relative axial movement of the workpiece support means away from each other and the second one of each adjacent pair of workpiece support means gripping its respective workpiece during relative axial movement of the workpiece support means away from each other, and means for automatically removing the peripheral weld upset formed between an adjacent pair of workpieces during friction welding, said weld upset removing means comprising:
shearing means,
and means interconnecting said shearing means and said associated first workpiece support means,
said interconnecting means supporting and positioning said shearing means relative to said first workpiece support means such that said shearing means is automatically drawn through the weld upset by said interconnecting means as said workpiece support means are moved away from each other upon completion of friction welding.

2. Friction welding apparatus as defined by claim 1 in which said shearing means is an annular cutter supported and positioned by said interconnecting means so as to coaxially surround during friction welding the workpiece supported by said second workpiece supporting means.

3. Friction welding apparatus as defined by claim 2 in which said annular cutter has surfaces facing generally radially inwardly and axially toward said first workpiece support means, said surfaces cooperating to define a continuous cutting edge having side rake angles such that said annular cutter peripherally progressively initiates and completes removal of the weld upset.

4. Friction welding apparatus as defined by claim 2 in which said second workpiece support means non-rotatably supports its workpiece and said first workpiece support means rotatably supports its workpiece, said first workpiece support means including a housing non-rotatably supporting said interconnecting means and said annular cutter during rotation of its workpiece.

5. Friction welding apparatus as defined by claim 4 further comprising means securing said second workpiece support means in an axially fixed position, said means for producing relative axial movement between said first and second workpiece support means comprising means axially slidably supporting the housing of said first workpiece support means and power cylinder means connected to said housing to exert axial force thereon to selectively move said first workpiece support means axially toward and away from said fixed second workpiece.

6. Friction welding apparatus as defined by claim 5 in which said second workpiece support means is axially interposed between a pair of first workpiece support means.

7. Friction welding apparatus as defined by claim 4 in which said interconnecting means comprises an annular carrier supporting said annular cutter and a plurality of axial pull bars interconnecting said annular carrier and the housing of said first workpiece support means.

8. Friction welding apparatus as defined by claim 7 in which said annular carrier is slidably mounted on said pull bars, said interconnecting means further comprising means spring biasing said annular carrier axially away from said housing such that relative axial movement between said first and second workpiece support means will not be prevented by engagement of said second workpiece support means or its workpiece by said annular carrier.

9. Friction welding apparatus as defined by claim 8 in which said annular cutter has surfaces facing generally radially inwardly and axially toward said first workpiece support means, said surfaces cooperating to define a continuous cutting edge having side rake angles such that said annular cutter peripherally progressively initiates and completes removal of the weld upset.

10. Friction welding apparatus as defined by claim 9 in which said generally radially inwardly facing surfaces of said annular cutter is disposed to provide suitable relief angles for providing clearance for the movement thereof over the workpieces and said generally axially facing surface of said annular cutter is disposed to provide suitable back rake angles for providing clearance for the weld upset removed by said annular cutter.

11. Friction welding apparatus as defined by claim 10 further comprising means securing said second workpiece support means in an axially fixed position, said means for producing relative axial movement between said first and second workpiece support means comprising means axially slidably supporting the housing of said first workpiece support means and power cylinder means connected to said housing to exert axial force thereon to selectively move said first workpiece support means axially toward and away from said fixed second workpiece support means.

12. Friction welding apparatus as defined by claim 11 in which said second workpiece support means is axially interposed between a pair of first workpiece support means.

* * * * *